United States Patent
Xia

(10) Patent No.: US 9,304,939 B2
(45) Date of Patent: Apr. 5, 2016

(54) METHOD AND MULTI-CORE COMMUNICATION PROCESSOR FOR REPLACING DATA IN SYSTEM CACHE

(71) Applicant: Huawei Technologies Co., Ltd., Shenzhen (CN)

(72) Inventor: Jing Xia, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 167 days.

(21) Appl. No.: 14/057,171

(22) Filed: Oct. 18, 2013

(65) Prior Publication Data

US 2014/0047188 A1 Feb. 13, 2014

Related U.S. Application Data

(63) Continuation of application No. PCT/CN2011/072932, filed on Apr. 18, 2011.

(51) Int. Cl.
*G06F 12/12* (2006.01)
*H04L 29/08* (2006.01)

(52) U.S. Cl.
CPC ............ *G06F 12/128* (2013.01); *G06F 12/121* (2013.01); *G06F 12/122* (2013.01); *H04L 67/2852* (2013.01)

(58) Field of Classification Search
CPC ............ G06F 12/128; G06F 17/30902; H04L 67/2852

See application file for complete search history.

(56) References Cited

U.S. PATENT DOCUMENTS

| | | | |
|---|---|---|---|
| 6,678,793 B1* | 1/2004 | Doyle | 711/133 |
| 2008/0229020 A1 | 9/2008 | Plamondon | |
| 2009/0113132 A1* | 4/2009 | Cain, III | G06F 12/127 711/133 |
| 2012/0151232 A1* | 6/2012 | Fish, III | 713/322 |

FOREIGN PATENT DOCUMENTS

| | | |
|---|---|---|
| CN | 1941952 A | 4/2007 |
| CN | 101232464 A | 7/2008 |

OTHER PUBLICATIONS

Hu, M., et al., "Time Over Weight: A New Cache Replacement Algorithm for P2P Live Media Streaming," Journal of Chinese Computer Systems, vol. 30, No. 8, Aug. 2009, pp. 1484-1489.

Foreign Communication From a Counterpart Application, PCT Application No. PCT/CN2011/072932, English Translation of International Search Report dated Jan. 19, 2012, 3 pages.

(Continued)

*Primary Examiner* — Ryan Bertram
(74) *Attorney, Agent, or Firm* — Conley Rose, P.C.; Grant Rodolph

(57) ABSTRACT

A method for replacing data in a system cache includes obtaining, by the system cache, an access statistics value corresponding to each piece of header data in the system cache, wherein the access statistics value corresponding to the header data represents a difference of the predetermined number of access times of the header data minus the number of times that the header data has been accessed by central processing units (CPUs); obtaining, by the system cache according to the access statistics value corresponding to each piece of header data, header data to be transferred; and transferring, by the system cache, the header data, which is to be transferred, to an external memory.

12 Claims, 4 Drawing Sheets

(56) References Cited

OTHER PUBLICATIONS

Foreign Communication From a Counterpart Application, PCT Application No. PCT/CN2011/072932, English Translation of Written Opinion dated Jan. 19, 2012, 4 pages.

Foreign Communication From a Counterpart Application, Chinese Application No. 201180000402.6, Chinese Office Action dated Nov. 22, 2013, 5 pages.

Foreign Communication From a Counterpart Application, Chinese Application No. 201180000402.6, Chinese Office Action dated May 20, 2013, 7 pages.

* cited by examiner

METHOD AND MULTI-CORE COMMUNICATION PROCESSOR FOR REPLACING DATA IN SYSTEM CACHE

CROSS-REFERENCE TO RELATED APPLICATIONS

This application is a continuation of International Application No. PCT/CN2011/072932, filed on Apr. 18, 2011, which is hereby incorporated by reference in its entirety.

TECHNICAL FIELD

The present invention relates to the field of multi-core communication processing technologies, and in particular, to a method and multi-core communication processor for replacing data in a system cache.

BACKGROUND

Generally, a cache is a high-speed buffer memory that is designed to improve the performance of a central processing unit (CPU), and performs data exchange with a primary memory by blocks. Currently, the cache is not only used for buffering local application data or instructions of the CPU, but also used for buffering various data packets in a network to improve the efficiency of the CPU in processing various data packets.

Now, with the gradual increase of user demands, the applications of multi-core communication processors become increasingly extensive. A multi-core communication processor has multiple CPUs and multiple network ports (the network ports are the most important inputs/outputs (IOs) of the multi-core communication processor). The main operation process of the multi-core communication processor is that the CPUs perform such processing as classification and encapsulation with respect to data packets incoming from the network ports, and after that, send the processed data packets out through the network ports. Each CPU has its own independent local cache. These local caches are exclusively used by the respective CPUs and are dedicated to optimizing the reading and writing efficiency of the CPUs. There is also a system cache on a system bus, and the system cache is shared by each CPU and each network port and is used for storing data between the CPUs and between the CPUs and the network ports to further improve the data reading and writing efficiency of the CPUs. In addition, the multi-core communication processor includes a packet scheduling module, which is mainly configured to schedule a CPU for processing a data packet. Scheduling the CPU for processing the data packet may be implemented in two modes: Pipeline and Run to Complete (RTC). Pipeline means that one data packet is processed in multiple processing steps performed by multiple CPUs respectively in sequence. RTC means one data packet is processed by one CPU from start to end.

Specifically, the process of processing a data packet includes the following steps:

(1) A network port receives a data packet, parses the data packet to obtain a header descriptor, and sends the header descriptor to the packet scheduling module, and the data packet is written into a system cache.

(2) The packet scheduling module determines, according to a particular scheduling algorithm, an idle CPU for processing the data packet, and sends the header descriptor of the data packet to the CPU to notify the CPU of processing the data packet.

(3) The CPU reads the data packet from the system cache and processes the data packet.

(4) After completing the processing, the CPU writes the processed data packet back to the system cache.

(5) The network port sends the data packet out.

If the RTC mode is used, steps 3 and 4 are executed by one CPU once only; if the Pipeline mode is used, steps 3 and 4 are executed by multiple CPUs multiple times.

As can be seen from the process, the most important factor affecting the performance of the multi-core communication processor is a hit rate of the CPU in the system cache in step 3, that is, the probability that the CPU finds the data packet in the system cache in step 3. Because the capacity of the system cache is limited, when data packets continuously enter the system cache from the network port, new data packets continuously replace old data packets in the system cache, and the old data packets are transferred to a Double Data Rate (DDR) double rate synchronous dynamic random access memory. As can be seen from the process, if the CPU can directly obtain the data packet from the system cache in step 3, the efficiency of accessing the data packet by the CPU is improved; and conversely, if the CPU cannot directly obtain the data packet from the system cache in step 3, it is necessary to find the data packet in the DDR, so that the efficiency of accessing the data packet by the CPU is greatly decreased.

The prior art provides an algorithm for replacing data packets in the system cache, that is, a Least Recently Used (LRU) method. This method assumes that a CPU is limited in terms of time and space. The data recently accessed by the CPU is very likely to be frequently accessed by the CPU in a next time period, and conversely, the data that has not been accessed for a long time will not be accessed by the CPU in a future time period. Therefore, when a packet in the system cache needs to be replaced, a least recently used packet is transferred from the system cache to the DDR. Many multi-core communication processors in the industry use the LRU algorithm. Some multi-core communication processors use algorithms similar to the LRU. For example, the system cache of the P4080 chip of FreeScale uses a Pseudo LRU (PLRU) algorithm; and the system cache of the ACP chip of LSI uses a True LRU algorithm.

SUMMARY

Embodiments of the present invention provide a method and multi-core communication processor for replacing data in a system cache, which can transfer header data in the system cache to an external memory.

In view of this, the embodiments of the present invention provide:

A method for replacing data in a system cache includes obtaining, by the system cache, an access statistics value corresponding to each piece of header data in the system cache, where the access statistics value corresponding to the header data represents a difference of a predetermined number of access times of the header data minus the number of times that the header data has been accessed by a CPU; obtaining, by the system cache according to the access statistics value corresponding to each piece of header data, header data to be transferred; and transferring, by the system cache, the header data, which is to be transferred, to an external memory.

A multi-core processor includes a system cache, where the system cache includes a data storing unit, configured to store each piece of header data; an access statistics value obtaining unit, configured to obtain an access statistics value corresponding to each piece of header data, where the access statistics value corresponding to the header data represents a difference of the predetermined number of access times of the header data minus the number of times that the header data has been accessed by a CPU; a unit for obtaining header data to be transferred, configured to obtain, according to the access statistics value corresponding to each piece of header data, the header data to be transferred; and a transferring unit, configured to transfer the header data, which is to be transferred, to an external memory.

In the embodiments of the present invention, when the header data in the system cache needs to be transferred to the external memory, the header data to be transferred is obtained according to the difference of the predetermined number of access times of the header data minus the number of times that the header data has been accessed by the CPU, and the header data to be transferred is transferred from the system cache to the external memory. In the process of obtaining the header data to be transferred, the difference of the predetermined number of access times of the header data minus the number of times that the header data has been accessed by the CPUs is considered, so that the probability that the transferred header data is the header data that has completed the last reading by the CPUs can be increased.

BRIEF DESCRIPTION OF DRAWINGS

To make the technical solutions of the embodiments of the present invention clearer, the accompanying drawings used in the description of the embodiments are briefly described below. The accompanying drawings illustrate only some exemplary embodiments of the present invention and persons skilled in the art may obtain other drawings based on these drawings without creative efforts.

DESCRIPTION OF EMBODIMENTS

Figure 1:
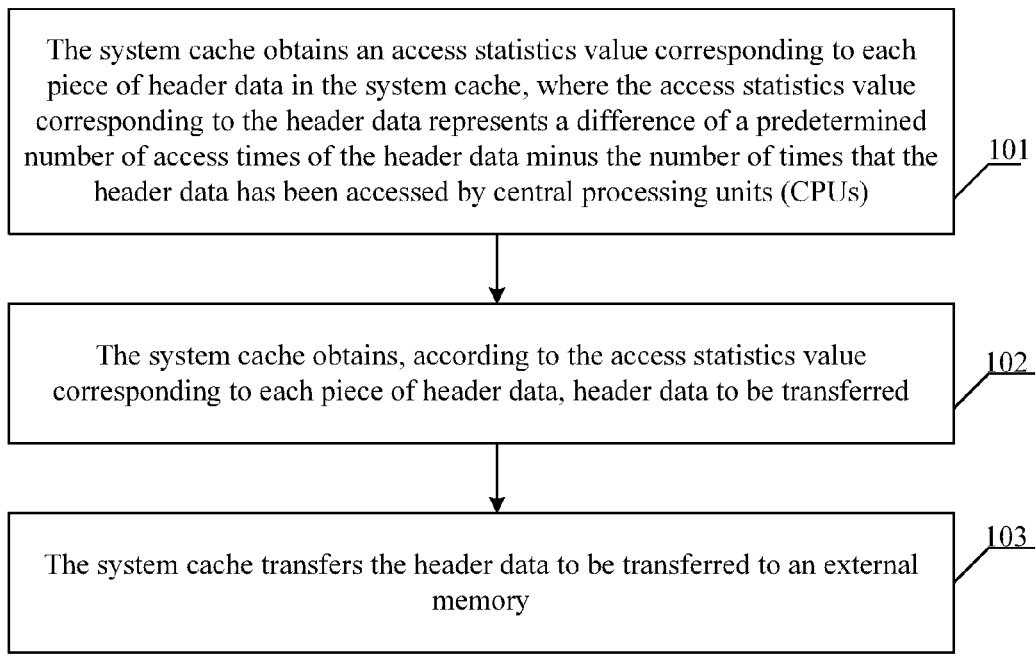
FIG. 1 is a flowchart of a method for replacing data in a system cache according to an embodiment of the present invention.

Referring to FIG. 1, an embodiment of the present invention provides a method for replacing data in a system cache. The method includes the following steps:

101: The system cache obtains an access statistics value corresponding to each piece of header data in the system cache, where the access statistics value corresponding to the header data represents a difference of a predetermined number of access times of the header data minus the number of times that the header data has been accessed by CPUs.

Before this step, the system cache receives the predetermined number of access times sent by a network port. The network port determines the predetermined number of access times according to the process of processing the data packet corresponding to the header data, that is, determines the predetermined number of access times of the header data according to whether an Internet Protocol (IP) packet fragment reassembly operation needs to be executed for the data packet, whether a deep packet parsing operation needs to be executed for the data packet, and whether the data packet corresponding to the header data is a data packet of an Internet Protocol Security type.

102: The system cache obtains, according to the access statistics value corresponding to each piece of header data, header data to be transferred.

Because the probability that the header data with a minimum access statistics value has completed the last access by the CPUs is the largest, a preferred implementation method for obtaining the header data to be transferred is finding a minimum value in the access statistics values corresponding to each piece of header data in the system cache, and obtaining at least one piece of header data in optional header data as the header data to be transferred, where the optional header data is the header data corresponding to the minimum value.

Before this step, the network port in the multi-core processor receives a data packet sent by a client. The data packet includes header data and a payload. The network port parses the header data to obtain an initial quality of service (QoS) class corresponding to the header data. A high QoS class represents a high priority of service, a low QoS class represents a low priority of service, and generally a service with a high QoS class should be assured preferentially. Therefore, when the header data in the system cache needs to be replaced, the header data with a low QoS class may be replaced and the header data with a high QoS class is retained in the system cache, so that the quality of service of the data packet with a high QoS class can be assured. Therefore, when there are multiple pieces of optional header data, according to the QoS classes corresponding to each piece of optional header data, the header data with a lowest QoS class in each piece of optional header data is obtained as the header data to be transferred. Specifically, the header data with a lowest initial QoS class may be selected, according to the initial QoS classes corresponding to each piece of optional header data, as the header data to be transferred; or the initial QoS classes corresponding to each piece of header data may be updated according to at least one of port information of a client that sends each piece of header data and a user level corresponding to each piece of header data, so as to obtain new QoS classes corresponding to each piece of header data, and use the header data with a lowest new QoS class as the header data to be transferred. The port information of the client that sends the header data may be port traffic of the client that sends the header data. The method for updating the initial QoS classes corresponding to each piece of header data to obtain the new QoS classes corresponding to each piece of header data may be as follows: adding new QoS information to the initial QoS classes of each piece of header data according to at least one of the port information of the client that sends each piece of header data and the user level corresponding to each piece of header data, so as to obtain the new QoS classes. The specific implementation is detailed in subsequent embodiments.

Optionally, in another implementation, the specific implementation method for obtaining the header data to be transferred may also be as follows: finding a minimum value and a second minimum value in the access statistics values corresponding to each piece of header data in the system cache, and then, finding the header data with a lowest QoS class in the header data corresponding to the minimum value and the second minimum value and using the found header data as the header data to be transferred.

103: The system cache transfers the header data, which is to be transferred, to an external memory.

The external memory may be a DDR.

In this embodiment of the present invention, when the header data in the system cache needs to be transferred to the external memory, the header data to be transferred is obtained according to the difference of the predetermined number of access times of the header data minus the number of times that the header data has been accessed by the CPUs, and the header data to be transferred is transferred from the system cache to the external memory. In the process of obtaining the header data to be transferred, the difference of the predetermined number of access times of the header data minus the number of times that the header data has been accessed by the CPUs is considered, so that the probability that the transferred header data is the header data that has completed the last reading by the CPUs can be increased.

Figure 2A:
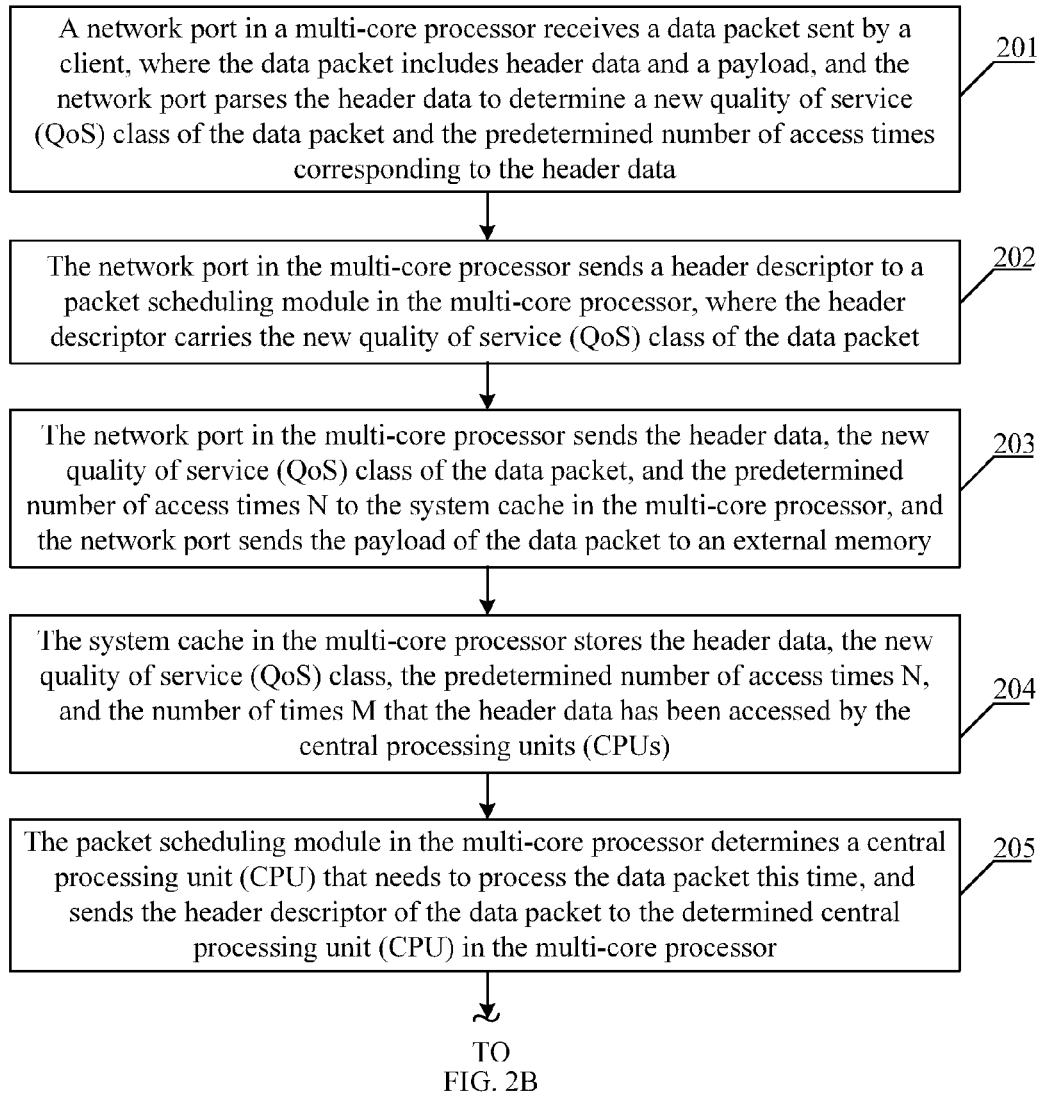
FIG. 2A and FIG. 2B are a flowchart of another method for replacing data in a system cache according to an embodiment of the present invention.
Figure 2B:
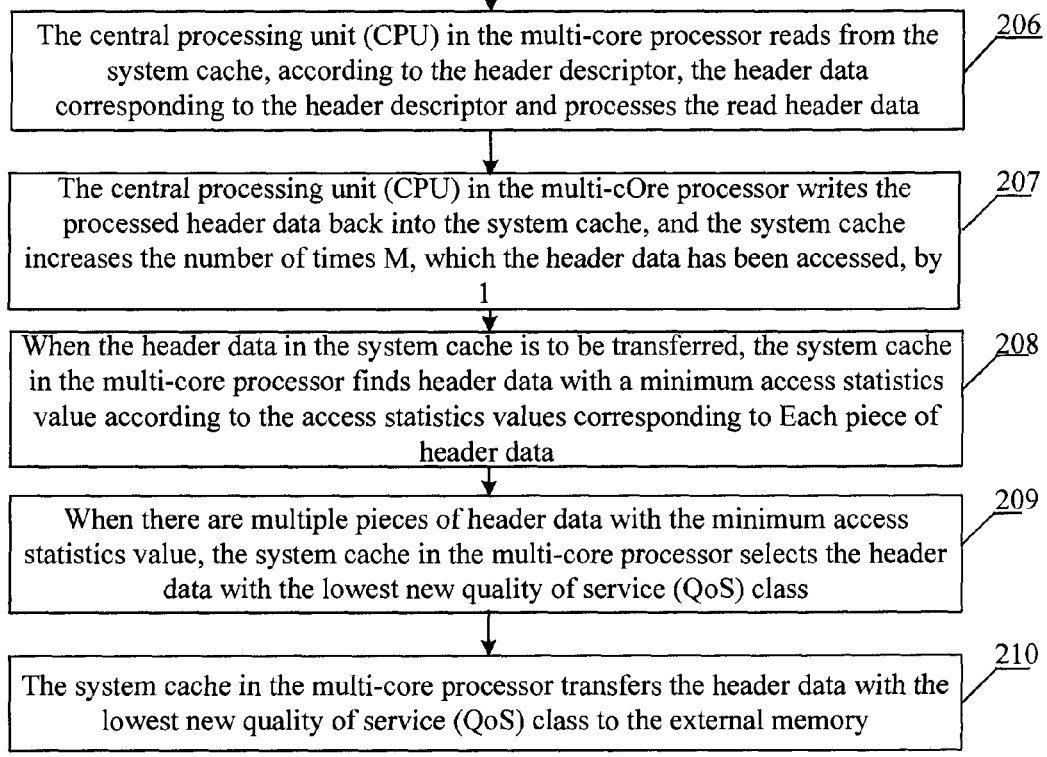

For better understanding of the technical solutions of the present invention, the technical solutions of the present invention are described in detail in the following embodiments:

Referring to FIG. 2A and FIG. 2B, an embodiment of the present invention provides another method for replacing data in a system cache. The method includes the following steps:

201: A network port in a multi-core processor receives a data packet sent by a client, where the data packet includes header data and a payload, and the network port parses the header data to determine a new QoS class of the data packet and the predetermined number of access times corresponding to the header data.

Specifically, the process for the network port to determine the new QoS class of the data packet includes the following: the network port parses the header data to obtain an initial QoS class of the data packet, and add additional QoS information to the initial QoS class according to at least one of port traffic of the client that sends the data packet and a user level corresponding to the data packet, so as to obtain the new QoS class. The user level corresponding to the data packet may be obtained in the following way: the network port determines the user level corresponding to the data packet according to a source IP address of the data packet and a locally stored mapping relationship between IP addresses and user levels.

Specifically, the QoS includes some binary bits and the magnitude of these bits represents a QoS class. The initial QoS class relates to a service type, for example, for a telephone service, the initial QoS class is high, and for a download service such as BT, the initial QoS class is low. The network port may obtain the initial QoS class by parsing the header data in the data packet, and then, the network port extends the QoS according to the port traffic of the client that sends the data packet and the user level and adds the additional QoS information on the basis of the initial QoS class to obtain the new QoS class. For example, 2 bits are added before the initial QoS class to represent the port traffic of the client that sends the data packet. If the port traffic is large, the value of the 2 bits is big, and if the port traffic is small, the value of the 2 bits is small. In another example, 3 bits are added after the initial QoS class to represent the user level corresponding to the data packet. If the user level is high, the value of the 3 bits is big, and if the user level is low, the value of the 3 bits is small.

The process for the network port to determine the predetermined number of access times corresponding to the header data is described as follows: after receiving the data packet, the network port finds the next hop route of the data packet and a CPU performs route lookup for the data packet, so that the CPU reads the header data of the data packet in the system cache at least once. Then the network port judges whether an IP packet fragment reassembly operation needs to be executed for the data packet; if yes, N is increased by 1, and at this time, N is 2. Then the network port judges whether a deep packet parsing operation needs to be executed for the data packet; if yes, N is increased by 1, and at this time, N is 3. Then the network port judges whether the data packet is a data packet of an Internet Protocol Security (IPSec) type; if yes, N is increased by 2, and at this time, N is 5. It should be noted that there is no necessary execution sequence for the foregoing judgments. It is also possible to firstly judge whether the data packet is a data packet of an IPSec type, which does not affect the implementation of the present invention.

202: The network port in the multi-core processor sends a header descriptor to a packet scheduling module in the multi-core processor, where the header descriptor carries the new QoS class of the data packet.

203: The network port in the multi-core processor sends the header data, the new QoS class of the data packet, and the predetermined number of access times N to the system cache in the multi-core processor, and the network port sends the payload of the data packet to an external memory.

There is no execution sequence between step 202 and step 203, and these two steps may be executed in parallel.

204: The system cache in the multi-core processor stores the header data, the new QoS class, the predetermined number of access times N, and the number of access times M that the header data has been accessed by the CPUs.

Specifically, the system cache may store the header data into one or more cache lines according to the size of the header data, and the system cache stores additional information for each cache line, where the additional information includes the new QoS class, the predetermined number of access times N, and the number of access times M that the header data has been accessed by the CPUs. For example, one cache line has 64 bytes, and the system cache additionally allocates 1 byte for the cache line. The 1 byte is used for storing the additional information.

205: The packet scheduling module in the multi-core processor determines a CPU that needs to process the data packet this time, and sends the header descriptor of the data packet to the determined CPU in the multi-core processor.

The header scheduling module stores header descriptors of multiple data packets, and according to the new QoS classes in the header descriptors of each data packet, the packet scheduling module determines which data packet needs to be processed by the CPU currently, where a data packet with a high new QoS class may be processed preferentially, and then, an idle CPU is determined and the header descriptor of the data packet to be processed is sent to the determined CPU.

206: The CPU in the multi-core processor reads from the system cache, according to the header descriptor, the header data corresponding to the header descriptor and processes the read header data.

Specifically, the CPU reads the header data from the cache line of the system cache according to the header descriptor and stores the header data in a local cache of the CPU. Assuming that the current processing is executing a deep packet parsing operation, the CPU may parse the header data and identify the service type of the data packet by means of characteristic identification, behavior identification, heuristic identification, or correlative identification.

207: The CPU in the multi-core processor writes the processed header data back into the system cache, and the system cache increases the number of access times M, which the header data has been accessed, by 1.

Specifically, the CPU writes the processed header data into the cache line, and the system cache increases the number of access times M in the additional information in the cache line by 1.

It should be noted that in step 206, the CPU reads, from the system cache, the header data corresponding to the header descriptor and stores the read header data into the local cache, and then, processes the header data in the local cache. Because the CPU is limited in terms of time and space, the header data stored in the local cache is stored for a time period without being deleted. In this way, if a header descriptor received by the CPU from the packet scheduling module next time is the same as the currently received header descriptor, the header data is directly found in the local cache and processed, so that if the packet scheduling module schedules the same CPU several consecutive times to process the same header data, the number of access times M corresponding to the header data that is recorded in the system cache is only increased by 1.

208: When the header data in the system cache is to be transferred, the system cache in the multi-core processor finds header data with a minimum access statistics value according to the access statistics values corresponding to each piece of header data.

An access statistics value corresponding to header data is a difference of the predetermined number of access times N of the header data minus the number of access times M that the header data has been accessed.

209: When there are multiple pieces of header data with the minimum access statistics value, the system cache in the multi-core processor selects the header data with the lowest new QoS class.

210: The system cache in the multi-core processor transfers the header data with the lowest new QoS class to the external memory.

It should be noted that in another implementation, whether there is one or multiple pieces of header data with the minimum access statistics value, the header data with the minimum access statistics value is transferred to the external memory. In this case, step 209 does not need to be executed, and in step 210, the header data with the minimum access statistics value is directly transferred to the external memory.

Subsequently, when the network port needs to send the data packet out, the header data of the data packet is read from the system cache, the payload of the data packet is read from the external memory, and the data packet including the header data and the payload is sent out. After the header data of the data packet is read from the system cache, the system cache deletes the header data of the data packet from the system cache so as to save the space of the system cache. For example, when the predetermined number of access times N of the header data is too large, and actually, the number of access times M that the header data is accessed by the CPUs is small, or because the header data is processed by the same CPU for several consecutive times, or when the number of access times M that the header data is accessed by the CPU is small. Therefore, the difference of the predetermined number of access times N minus the number of access times M that the header data has been accessed by the CPUs is large, so the header data is not easy to be transferred by the system cache to the external memory, and after the network port reads the header data of the data packet, the header data is deleted.

In this embodiment of the present invention, when the header data in the system cache needs to be transferred to the external memory, the header data with the minimum N-M is found according to the difference of the predetermined number of access times N of the header data minus the number of access times M that the header data has been accessed, and is transferred from the system cache to the external memory. An algorithm for replacing data in a system cache that are provided by the prior art assume that a CPU is limited in terms of time and space, but before the packet scheduling module sends the header descriptor to the CPU processing the data packet, blocking may occur when the header descriptor queues locally in the packet scheduling module, so that when the CPU accesses the header data of the data packet, the header data has been replaced and transferred out of the system cache because of not being accessed for a long time, thus greatly decreasing the efficiency of accessing the header data by the CPU. When determining the header data to be transferred, the present invention selects the header data with the minimum N-M to transfer. Minimum N-M means that the probability that the header data has completed the last reading by the CPUs is increased. Therefore, the header data that has not completed the last reading by the CPUs is still in the system cache, and the hit rate is increased when the CPUs subsequently obtain the header data to be processed from the system cache.

Figure 3:
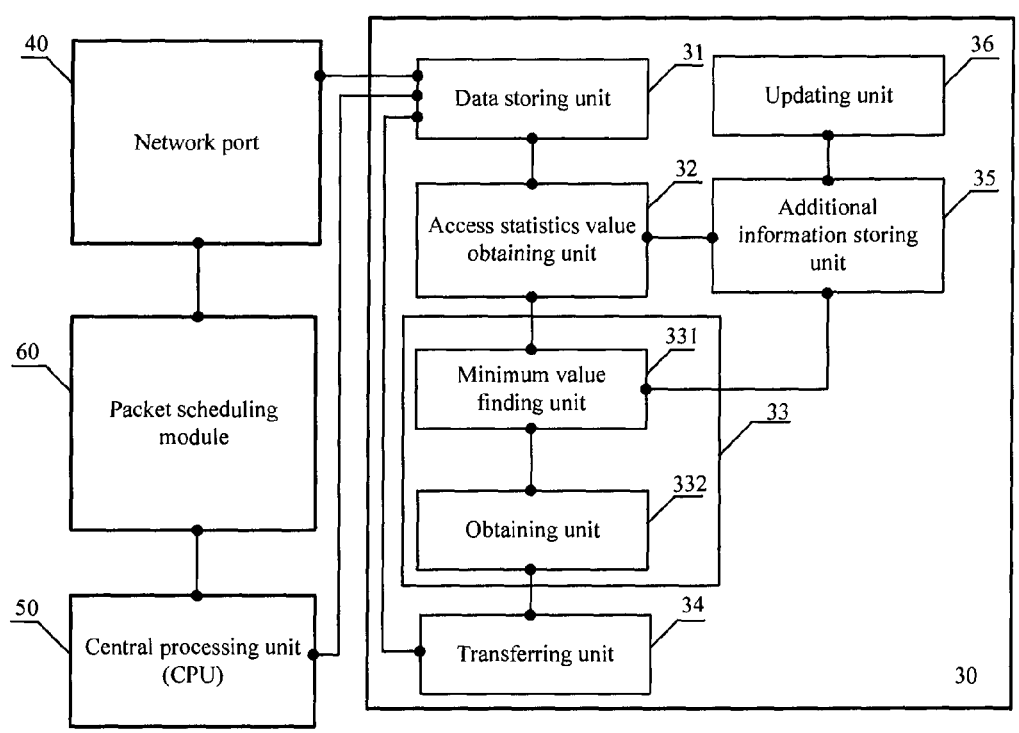
FIG. 3 is a structural diagram of a multi-core processor according to an embodiment of the present invention.

Referring to FIG. 3, an embodiment of the present invention provides a multi-core processor, including a system cache 30.

The system cache 30 includes a data storing unit 31, configured to store each piece of header data, an access statistics value obtaining unit 32, configured to obtain an access statistics value corresponding to each piece of header data, where the access statistics value corresponding to the header data represents a difference of the predetermined number of access times of the header data minus the number of times that the header data has been accessed by CPUs, a unit 33 for obtaining header data to be transferred, configured to obtain, according to the access statistics value obtaining unit 32 corresponding to each piece of header data, the header data to be transferred, and a transferring unit 34, configured to transfer the header data, which is to be transferred, to an external memory.

The predetermined number of access times and the number of times that the header data has been accessed by the CPUs may be stored in the system cache 30, or may be stored outside the system cache 30. When the predetermined number of access times and the number of times that the header data has been accessed by the CPUs need to be stored in the system cache, the system cache 30 also includes: an additional information storing unit 35, configured to store the predetermined number of access times of the header data stored by the data storing unit 31 and the number of times that the header data has been accessed by the CPUs. An updating unit 36 is configured to update, when the header data stored by the data storing unit 31 is accessed by a CPU, the number of times that the header data has been accessed by the CPUs.

Specifically, the access statistics value obtaining unit 32 is configured to find a minimum value in the access statistics values corresponding to each piece of header data and obtain at least one piece of header data in optional header data as the header data to be transferred, where the optional header data is the header data corresponding to the minimum value.

In an implementation, the additional information storing unit 35 is also configured to store a QoS class corresponding to the header data stored by the data storing unit 31. The unit 33 for obtaining header data to be transferred specifically includes: a minimum value finding unit 331, configured to find the minimum value in the access statistics values corresponding to each piece of header data, and an obtaining unit 332, configured to obtain, when there are multiple pieces of optional header data, according to the QoS classes corresponding to the optional header data, header data with a lowest QoS class in each piece of optional header data as the header data to be transferred. The QoS classes may be initial QoS classes parsed according to the header data sent by clients or new QoS classes obtained by adding additional QoS information to the initial QoS classes.

In order to obtain the QoS classes, the multi-core processor also includes a network port 40, configured to parse each piece of header data to determine an initial QoS class corresponding to each piece of header data, and respectively update the initial QoS class corresponding to each piece of header data according to at least one of port information of a client that sends the piece of header data and a user level corresponding to the piece of header data, so as to obtain a new QoS class corresponding to each piece of header data, that is, a new QoS class obtained by respectively adding additional QoS information to the initial QoS class corresponding to each piece of header data.

Optionally, in order to determine the predetermined number of access times of the header data, the network port 40 is also configured to determine the predetermined number of access times corresponding to each piece of header data according to whether an IP packet fragment reassembly operation needs to be executed for the data packet corresponding to each piece of header data, whether a deep packet parsing operation needs to be executed for the data packet corresponding to each piece of header data, and whether the data packet corresponding to each piece of header data is a data packet of an IPSec type, and send the predetermined number of access times corresponding to each piece of header data to the system cache.

Optionally, the multi-core processor also includes a CPU 50 and a packet scheduling module 60. The network port 40 is also configured to send a header descriptor to the packet scheduling module 60, wherein the header descriptor includes a QoS class, that is, an initial QoS class or a new QoS class. The packet scheduling module 60 determines, according to the QoS class in the header descriptor, that the CPU 50 needs to process the header data, and sends the header descriptor of the header data to the CPU 50. Subsequently, the CPU 50 reads the header data from the data storing unit 31 according to the header descriptor.

In this embodiment of the present invention, when the header data in the system cache needs to be transferred to the external memory, according to the difference of the predetermined number of access times of the header data minus the number of times that the header data has been accessed, the header data with the minimum difference is found and is transferred from the system cache to the external memory. When the header data to be transferred is determined, the difference of the predetermined number of access times of the header data minus the number of times that the header data has been accessed by the CPUs is considered so that the probability that the transferred header data is the header data that has completed the last reading by the CPUs can be increased.

Persons skilled in the art may understand that all or part of steps in the methods of the above embodiments may be implemented by related hardware instructed by a program. The program may be stored in a computer readable storage medium, such as a read only memory (ROM), a magnetic disk, or an optical disc.

The above is a detailed introduction to a method and multi-core communication processor for replacing data in a system cache according to the embodiments of the present invention. Although the principle and implementation of the present invention are described with reference to exemplary embodiments, the embodiments are only intended to help understand the method and core idea of the present invention. In addition, with respect to the implementation and the application scope of the present invention, modifications and variations may be made by persons skilled in the art according to the idea of the present invention. Therefore, the specification shall not be construed as a limitation on the present invention.

What is claimed is:

1. A method for replacing data in a system cache, comprising:
    obtaining, by the system cache, an access statistics value corresponding to each piece of header data in the system cache, wherein the access statistics value corresponding to the header data represents a difference of a predetermined number of access times of the header data minus a number of times that the header data has been accessed by central processing units (CPUs), and wherein the number of times that the header data has been accessed by CPUs includes both write operations and read operations;
    obtaining, by the system cache according to the access statistics value corresponding to each piece of header data, header data to be transferred; and
    transferring, by the system cache, the header data to an external memory.

2. The method according to claim 1, wherein the system cache updates the number of times that the header data has been accessed by the CPUs each time the header data in the system cache is accessed by the CPUs.

3. The method according to claim 1, wherein obtaining the header data to be transferred comprises:
    finding, by the system cache, a minimum value in access statistics values corresponding to the header data; and
    obtaining, by the system cache, at least one piece of header data in optional header data as the header data to be transferred, wherein the optional header data is header data corresponding to the minimum value.

4. The method according to claim 3, wherein obtaining at least one piece of header data in the optional header data as the header data to be transferred comprises obtaining, according to quality of service (QoS) classes corresponding to an optional header data, header data with a lowest QoS class in the optional header data as the header data to be transferred.

5. The method according to claim 4, wherein before obtaining the header data with the lowest QoS class in each piece of optional header data as the header data to be transferred, the method further comprises:
    parsing each piece of header data to determine an initial QoS class corresponding to each piece of header data; and
    updating the initial QoS class corresponding to each piece of header data according to at least one of port information of a client that sends each piece of header data and a user level corresponding to each piece of header data so as to obtain a new QoS class corresponding to each piece of header data,
    wherein obtaining the header data with the lowest QoS class in each piece of optional header data as the header data to be transferred comprises obtaining header data with a lowest new QoS class in the optional header data according to new QoS classes corresponding to the optional header data.

6. The method according to claim 1, wherein before the system cache obtains the access statistics value corresponding to each piece of header data in the system cache, the method further comprises:
    determining, by a network port, the predetermined number of access times of the header data according to whether an Internet Protocol (IP) packet fragment reassembly operation needs to be executed for a data packet corresponding to the header data;
    determining whether a deep packet parsing operation needs to be executed for the data packet corresponding to the header data;

determining whether the data packet corresponding to the header data is a data packet of an Internet Protocol Security type; and sending the predetermined number of access times of the header data to the system cache.

7. A multi-core processor comprising a system cache, wherein the system cache comprises:

a data storing unit configured to store header data;

an access statistics value obtaining unit configured to obtain an access statistics value corresponding to each piece of header data, wherein the access statistics value corresponding to the header data represents a difference of a predetermined number of access times of the header data minus a number of times that the header data has been accessed by central processing units (CPUs), and wherein the number of times that the header data has been accessed by CPUs includes both write operations and read operations;

a header data obtaining unit configured to obtain, according to the access statistics value corresponding to each piece of header data, the header data to be transferred; and a transferring unit configured to transfer the header data to an external memory.

8. The multi-core processor according to claim 7, wherein the system cache further comprises:

an additional information storing unit configured to store the predetermined number of access times of header data stored by the data storing unit and the number of times that the header data stored by the data storing unit has been accessed by the CPUs; and an updating unit configured to update the number of times that the header data has been accessed by the CPUs when the header data stored by the data storing unit is accessed by the CPUs.

9. The multi-core processor according to claim 7, wherein the header data obtaining unit is configured to find a minimum value in access statistics values corresponding to the header data and obtain at least one piece of header data in optional header data as the header data to be transferred, and wherein the optional header data is header data corresponding to the minimum value.

10. The multi-core processor according to claim 9, further comprising an additional information storing unit configured to store quality of service (QoS) classes corresponding to the header data stored by the data storing unit, wherein the header data obtaining unit comprises:

a minimum value finding unit configured to find a minimum value in the access statistics values corresponding to each piece of header data; and an obtaining unit configured to obtain, according to QoS classes corresponding to the optional header data, header data with a lowest QoS class in each piece of optional header data as the header data to be transferred when there are multiple pieces of optional header data.

11. The multi-core processor according to claim 10, wherein the multi-core processor further comprises a network port configured to parse each piece of header data to determine an initial QoS class corresponding to each piece of header data and respectively update the initial QoS class corresponding to each piece of header data according to at least one of port information of a client that sends each piece of header data and a user level corresponding to each piece of header data so as to obtain a new QoS class corresponding to each piece of header data, and wherein the obtaining unit is configured to obtain header data with a lowest new QoS class in the optional header data according to new QoS classes corresponding to the optional header data.

12. The multi-core processor according to claim 7, wherein the multi-core processor further comprises a network port configured to;

determine the predetermined number of access times of the header data according to whether an IP packet fragment reassembly operation needs to be executed for a data packet corresponding to the header data;

determine whether a deep packet parsing operation needs to be executed;

determine whether the data packet corresponding to the header data is a data packet of an Internet Protocol Security type; and send the predetermined number of access times of the header data to the system cache.

* * * * *